United States Patent [19]

Wiley

[11] 4,012,598
[45] Mar. 15, 1977

[54] METHOD AND MEANS FOR PULSE RECEIVER SYNCHRONIZATION

[75] Inventor: Paul Ronald Wiley, Naperville, Ill.

[73] Assignee: Bell Telephone Laboratories, Incorporated, Murray Hill, N.J.

[22] Filed: Jan. 14, 1976

[21] Appl. No.: 649,045

[52] U.S. Cl. .............................. 178/69.1; 328/72
[51] Int. Cl.² ........................................ H04L 7/08
[58] Field of Search ................ 178/53, 69.5 R; 179/15 BS; 328/55, 63, 72, 75, 155

[56] References Cited

UNITED STATES PATENTS

| | | | |
|---|---|---|---|
| 3,839,599 | 10/1974 | Pitroda | 178/69.5 R |
| 3,851,100 | 11/1974 | Herzog | 178/69.5 R |
| 3,887,769 | 6/1975 | Cichetti, Jr. et al. | 178/69.5 R |
| 3,908,084 | 9/1975 | Wiley | 178/69.5 R |
| 3,920,900 | 11/1975 | Fineman | 178/69.5 R |

Primary Examiner—Benedict V. Safourek
Attorney, Agent, or Firm—Charles H. Davis

[57] ABSTRACT

A receiver is disclosed which operates for synchronously receiving pulses of a serial stream without synchronizing the receiver clock to the clock at a transmitting site. Circuitry is provided for generating multiple delayed pulse signals in response to each incoming pulse and for sampling and maintaining a sequence of the most recent samples of the pulse signals. Decoding logic detects state transitions within the sequence, the location therein being indicative of the phase of the pulses relative to the clock signals. The decoding logic operates other circuitry for tracking the phase of the pulses as it drifts. The phase tracking circuitry enables the selection of ones of the samples which are synchronized, or in pulse durational phase, with the receiver clock for reconstructing the incoming pulse stream.

24 Claims, 8 Drawing Figures

METHOD AND MEANS FOR PULSE RECEIVER SYNCHRONIZATION

BACKGROUND OF THE INVENTION

My invention relates to data transmission systems and, particularly, to method and means for synchronizing the data transfer between such systems.

In such systems of the synchronous type, it is known that a clock at a receiving site must be synchronized with the clock at a transmitting site, or other means provided for compensating for the lack of synchronization in order that data pulses be adequately communicated between the sites. It is common practice, for example, to utilize a phase-locked loop, wherein a receiver clock is synchronized with a transmitter clock by recovering timing information from the incoming pulses for controlling the frequency and phase of the receiver clock. One such synchronizing technique is analyzed in an article by C. J. Byrne in the *Bell System Technical Journal*, Vol. 41, 1962, at page 559. Another method of synchronizing clocks at a plurality of sites which communicate with each other involves what is called phase or frequency averaging. At each location the clock is synchronized to the average of the frequency and phase of each of the pulse streams arriving from each of the other sites. This technique is discussed briefly by J. S. Mayo in the *Bell System Technical Journal*, Vol. 44, 1965, beginning at page 1813.

The foregoing techniques typically involve the use of analog circuitry which may be difficult to control and expensive in that separate phase-locking circuitry is required for each transmission line incoming to a receiving site. W. K. L. Chang et al in their U.S. Pat. No. 3,484,555 of Dec. 16, 1969, disclose a digital phase locking circuit for overcoming some of the disadvantages of the analog counterpart. They provide an independent oscillator at the receiver and a counter for counting the signals from the oscillator, the output of which provides the clock signals for sampling the incoming pulses. The counter output is controlled for synchronization with the pulses by circuitry which responds to transistions of the pulses for either advancing or retarding the count state of the counter. Thus, their receiver clock is derived from the incoming pulse stream so as to lock the clock to the frequency and phase of the pulses.

SUMMARY OF THE INVENTION

Contrary to phase-locking techniques, I teach a receiver synchronizing method which comprises the steps of generating binary sequences representing multiple samples of received pulses and using the sequences to control the selection of ones of the samples having a predetermined phase relationship to the pulses. A feature of my invention involves the additional steps of analyzing successive ones of the sequences to determine when the pulses have drifted with respect to the selected samples and compensating for the drift by controlling the selection of other prescribed ones of the samples.

For implementing the foregoing method, one illustrative receiver includes circuitry operated by clock signals for generating multiple spaced samples of each of the pulses as they arrive. Other circuitry is provided for detecting prescribed sequences of these samples indicative of the phase relationship between the pulse and clock signals. State circuitry is operated by the detecting circuitry for dynamically controlling the selection of ones of the samples which are in pulse durational phase with the clock signals. For compensating for the accumulated phase drift, the state circuitry further comprises logic circuits operative for selecting plural samples from the sequence or for omitting a sample selection each time the phase drift exceeds a prescribed amount. The selected samples are sequentially inputted into an output register for reconstructing the incoming pulse stream.

In a preferred exemplary embodiment, the foregoing generating circuitry comprises a delay line having an input port for accepting the pulses and three output ports on which appear successively delayed pulse signals in response to each of the input pulses. The pulse signals are sampled simultaneously with each clock signal and used for updating the state of storage circuitry wherein a sequence of most recent ones of the samples is continuously maintained. The simultaneous sampling of each of the delay line output ports is effectively equivalent to directly sampling the incoming pulses at a rate greater than the pulse arrival rate to obtain successive time displaced samples for forming the sequence of samples. The detecting circuitry detects state transitions at prescribed locations in the sequence of samples. In turn, this circuitry operates state circuits according to the location of the transitions in the sequence. The state circuits control the selection of preferred ones of the samples in the sequence for tracking the phase drift. As the phase drift of the pulses accumulates, a point is recurringly reached at which it is necessary to compensate therefor to return to essentially a zero phase differential. In the preferred exemplary embodiment this point corresponds illustratively to an accumulation of one clock interval of phase differential. The phase drift of one clock interval is manifested by a desired shift of the preferred samples out of the sequence. At that time, the drift is compensated by circularly progressing from a selection of one end sample to the other end sample in the sequence. In order to prevent the double sampling of a pulse or the omission of a sample of a pulse during the phase drift compensation, the receiver omits one redundant sample if the pulses are arriving slower than the clock signals or selects two different samples corresponding to adjacent pulses from the sequence if the pulses are arriving faster than the clock signals.

It is believed that my invention provides the following advantages over the prior art. In that the transmitting and receiving clocks are independent, there is no need for phase-locked loop control between the same. Thus, a single receiver clock suffices for receiving data from any number of sources without the need for phase-locking circuitry dedicated individually for each source. The preferred embodiment employs simple solid state logic elements in a configuration which, as will be seen, permits multiple pulse sampling without operating the clock and logic circuits at the higher sampling frequency. Thus, difficulties such as noise sensitivity and interference with logic gate settling times at high frequencies are reduced. Furthermore, the multiple sampling of pulses provides a degree of noise filtering which provides a tolerance of noise, pulse degradation and jitter. Finally, the recurrence rate of pulse transitions required to maintain synchronization is dependent only on the rate of sampling and the maximum difference in transmitter and receiver clock frequencies. This relationship appears to result in a generally lower required recurrence rate to maintain synchronization than for phase-locked loop techniques.

BRIEF DESCRIPTION OF THE DRAWING

The foregoing and other features and advantages of my invention will be more apparent upon a reading of the following detailed description taken in conjunction with the drawing, in which.

DETAILED DESCRIPTION

Figure 1:
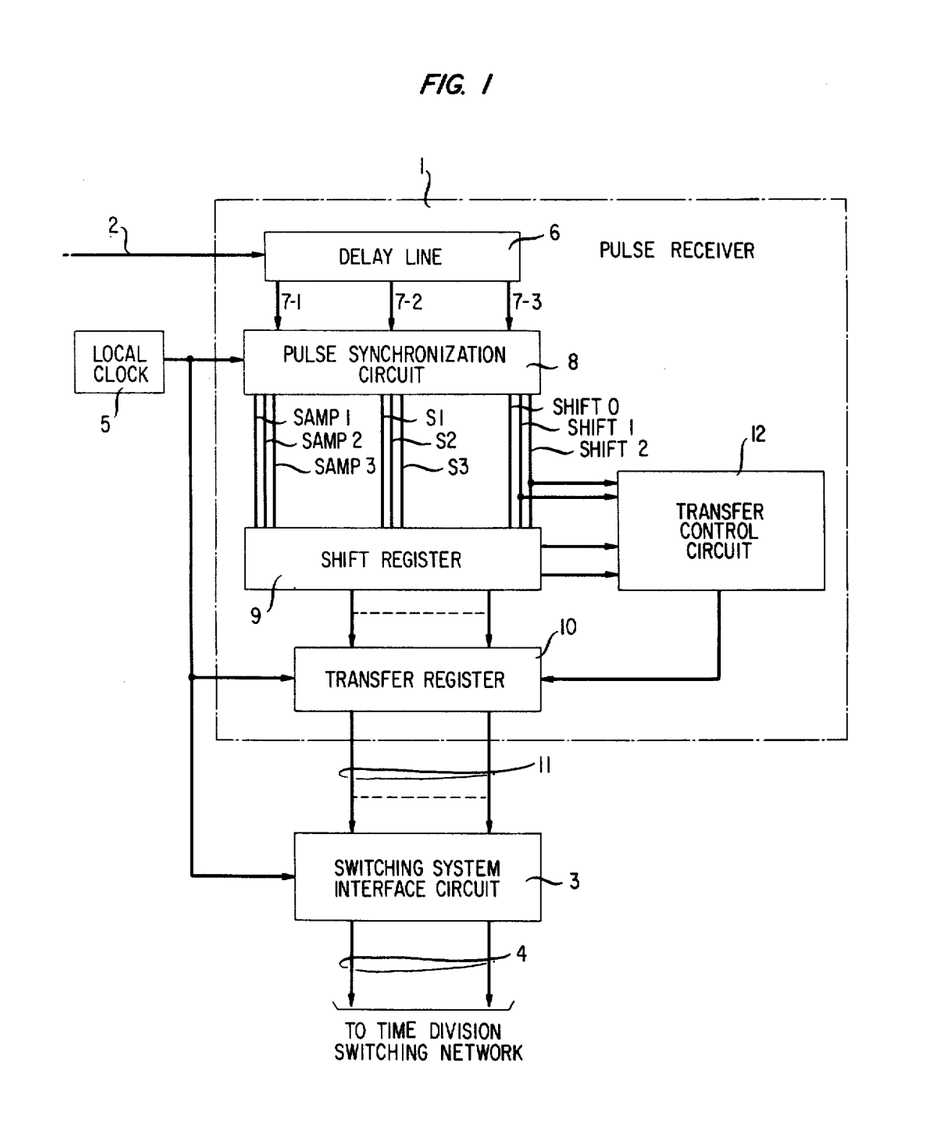
FIG. 1 illustrates a block configuration of the salient circuits of my receiver.

A preferred exemplary embodiment of the receiver is illustrated in block diagram form in FIG. 1 and operates for receiving a pulse stream from, for example, a distant telephone switching exchange or other data facility on transmission line 2. In this illustrative embodiment, the pulse data represents pulse code modulated, or PCM, time division multiplexed telephone trunk channels which are encoded in a non-return-to-zero (NRZ) format. The pulses are illustratively partitioned into 128 time slots to form recurrent 125-microsecond timing frames. Each time slot is encoded with 8 binary bits in a well-known manner.

Receiver 1 operates for serially receiving the foregoing data in 8-bit bytes, by way of example, which do not necessarily correspond to the 8 bits of a PCM time slot channel, and for transferring each byte in parallel format to the switching system interface circuit 3. Circuit 3 interfaces with the network of a time division multiplex switching system, not shown, which operates to reconstruct the bytes into time slot characters by utilizing frame synchronization bits transmitted with the pulse data and to distribute the characters to the network via bus 4 in the proper time slots.

Receiver 1 is operated for receiving the pulses by a local clock 5 which is designed to function substantially at the arrival frequency of the incoming pulses. Since clock 5 is autonomous, the pulses and the clock 5 signals are not precisely synchronized and a drift of the pulses relative to the clock signals occurs. Receiver 1 automatically tracks the drift and compensates therefor and, importantly, without utilizing any phase-lock loop control between receiver 1 and the clock of the transmitting exchange. Receiver 1 performs this synchronization by maintaining a sequence of most recent multiple samples of the pulses and by examining pulse transitions in the sequence as the transitions move across the sequence as a result of the phase drift.

To elaborate, the arriving pulses are routed into a delay line 6. Delay line 6 continuously delays the pulses illustratively by two-thirds of a clock interval, or approximately 40 nanoseconds in this illustrative embodiment. Delay line 6 has three output ports 7-1 to 7-3 on which appear pulse signals successively delayed by approximately 0, 20 and 40 nanoseconds, all of which are routed to the pulse synchronization circuit 8. Synchronization circuit 8 is operated by clock 5 to simultaneously sample the information appearing on each of the foregoing ports with the occurrence of each clock signal. Moreover, circuit 8 is provided with storage apparatus for continuously maintaining therein the most recent set of samples together with the set of samples taken at the immediately preceding clock time to form a sequence of samples spanning the previous 100 nanoseconds at 20 nanosecond intervals. Hereinafter, these sets of samples are respectively referred to as current-look and last-look samples.

Synchronization circuit 8 utilizes the pulse transitions in the entire sequence of six samples for dynamically selecting ones of the ports 7-1 to 7-3 whose pulse signals are in pulse durational phase with clock 5, and for sequentially routing the samples from storage apparatus associated with the selected port into a shift register 9.

The leads S1 to S3, extending from circuit 8 to shift register 9, carry "state" signals which identify a currently selected one of ports 7-1 to 7-3. Circuit 8 also has connections SAMP1 through SAMP3 which extend to shift register 9 and are associated, respectively, with the storage apparatus in circuit 8 pertaining to each of the ports 7-1 to 7-3 for transferring samples to register 9. The signals on leads S1 to S3 control register 9 for steering the pulse samples taken from a selected port into the register via the leads SAMP1 to SAMP3. Moreover, the signals on leads S1 to S3 are dynamically controlled by circuit 8 as the incoming pulse stream drifts relative to the clock 5 signals so that, as the selected port changes, register 9 accepts samples only from the storage apparatus pertaining to the selected port.

In order to provide for the reception of pulses without interruption, the contents of register 9 are periodically transferred to a transfer register 10, under the control of transfer control circuit 12, thus freeing register 9 for accepting new samples. At that time register 10 alerts the interface circuit 3 of the presence of a byte. Circuit 3 thereupon accepts the byte from register 10 via bus 11. Circuit 3 appends the byte to the data already received from receiver 1 and operates by means of its own frame and time slot synchronizing circuitry to sort and distribute to the switching network (not shown) the time slot characters which make up each of the telephone channels on transmission line 2.

Returning to the operation of synchronization circuit 8, the phase drift of the incoming pulses is manifested by a shifting of the selected port 7-1 to 7-3 in a given direction dictated by the arrival rate of the pulses relative to the clock 5 signals. Thus, if the pulses are arriving slower than the clock signals, the pulses are said to be lagging and the synchronized port selection progresses circularly from 7-3 to 7-2 to 7-1, returning to 7-3 and so on. Conversely, if the pulse arrival rate is greater than that of the clock signals, the pulses are leading and the selected port moves circularly in the opposite direction. The reader may appreciate that when the selected port moves from 7-3 to 7-1 or vice versa, steps must be taken to prevent the introduction of sampling errors. Specifically, depending upon whether the pulse stream is leading or lagging, a pulse sample may be entirely omitted or a pulse may be sampled twice. In accordance with a feature of my invention, synchronization circuit 8 compensates for such erroneous results, as will be described, by providing control signals on leads SHIFT0 through SHIFT2 which extend to register 9 and to transfer control circuit 12. These signals enable shift register 9 either to omit a sample or to accept double samples from appropriate ones of the ports 7-1 to 7-3 to prevent error during the compensation for phase drift.

Figure 2:
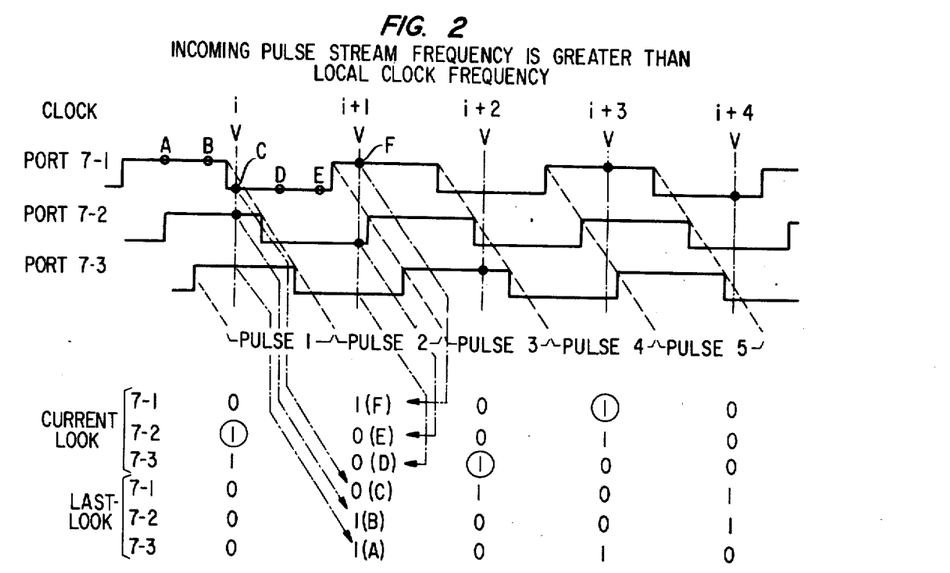
FIGS. 2 and 3 illustrate a series of pulse waveforms which are helpful for understanding the invention.
Figure 3:
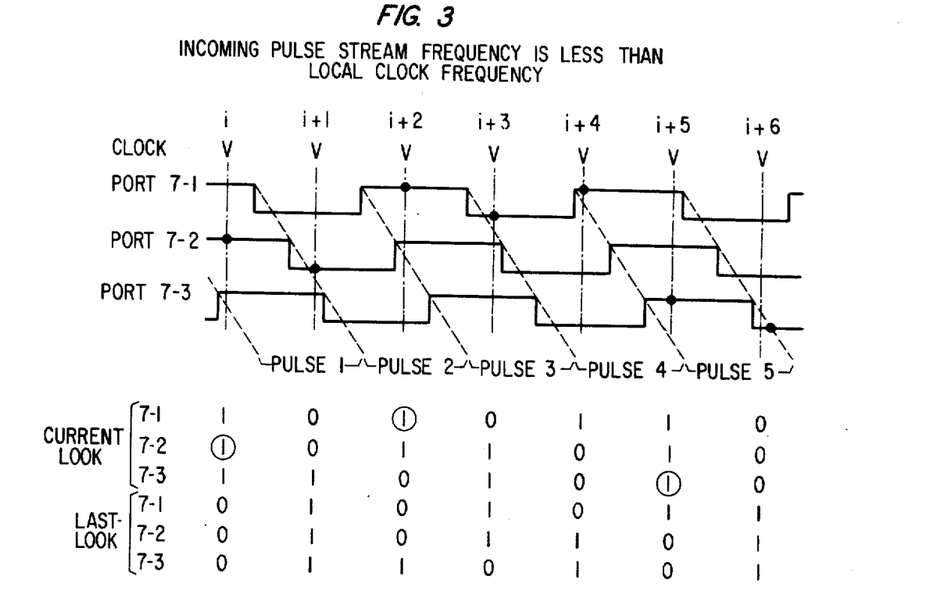

A better understanding of the phase tracking operations may be obtained by reference to FIGS. 2 and 3 which show illustrative pulse waveforms of the delay line ports 7-1 to 7-3. In FIG. 2, one illustrative sequence of pulses of a frequency slightly grater than that of clock 5 is shown in relation to the clock signals $i$ through $i + 4$. Conversely, FIG. 3 illustrates similar waveforms which are of a frequency slightly less than that of clock 5. The uppermost waveform in FIG. 2 corresponds to pulse appearing on output port 7-1. The lower two waveforms appear on output ports 7-2 and 7-3. The column of binary numbers below each of the clock times $i$ through $i + 4$ illustrate the last-look and the current-look samples of the waveforms at each of the ports. The arrows extending from the waveforms to the column samples at $i + 1$ relate the samples in the sequence to points in the waveforms to which they pertain. In this illustrative embodiment, the waveform on port 7-1 is identical in phase relationship to the incoming waveform at the input of the delay line by virtue of the zero delay of the first output port. By comparing the samples labeled A through F in the column sequence at time $i+1$ to the correspondingly labeled points on the port 7-1 waveform, it is seen that the samples when read from A to F form a sequence of samples which span the preceding two clock intervals. Circuit 8 examines the entire sequence from A to F each clock time for state transitions between samples in order to select a synchronized port and to track the pulse phase drift. Although both 0 to 1 and 1 to 0 transitions may be utilized for this purpose, it is sufficient to locate only 0 to 1 transitions and the remainder of this discussion deals only with this case. Since the samples on the ports 7-1 to 7-3 are successively delayed by intervals of one-third of a clock interval, the delay line 6 port pertaining to the second 1 sample, occurring in time sequence after a 0 to 1 transition, corresponds to the currently synchronized port. For example, at clock time $i$ in FIG. 2, a 0 to 1 transition occurs between the last-look sample from port 7-1 and the current-look sample from port 7-3. The encircled sample in the sequence from port 7-2 is the second 1 sample in time sequence after the transition and identifies port 7-2 as the currently synchronized port. The point in the duration of pulse 1 on port 7-2 corresponding to the encircled sample is illustrated in FIG. 2 at clock time $i$ by the dot on the port 7-2 waveform. Proceeding to clock time $i + 1$, it is seen that a transition occurs between current-look samples at ports 7-2 and 7-1, but because there can be no second 1 sample in time sequence following the transition, that is no 1 sample after the F sample, circuit 8 continues to select the last synchronized port 7-2 for sampling pulse 2. At clock time $i + 2$, a transition occurs followed by a 1 from port 7-3. Accordingly, circuit 8 now selects port 7-3 as that synchronized with clock 5. At clock time $i + 3$, another transitional sequence occurs which indicates a desired shift from selected port 7-3 to port 7-1. As priorly mentioned, such a shift between the terminal ports of delay line 6 indicates that the incoming pulses have drifted with respect to clock 5 by one full clock interval. An immediate shift to port 7-1 by circuit 8 would result in the omission of a sample of pulse 4 as may be seen by referring to FIG. 2 because, by shifting to port 7-1, the phase of a sampled waveform is advanced by the delay of delay line 6.

In accordance with a feature of my invention to be described, the foregoing erroneous sample omission is corrected by shifting to an intermediate pulse sampling state at clock time $i + 3$ and by sampling from two ports, 7-3 followed by 7-1. In this manner, a sample of pulse 4 is obtained at $i + 3$ from port 7-3 and of pulse 5 from port 7-1.

FIG. 3 illustrates the situation converse to that in FIG. 2 in which the waveforms on ports 7-1 to 7-3 are of a frequency which is less than that of clock 5. In this case, the incoming pulse stream tends to drift in a direction opposite to that shown in FIG. 2. By examining the last-look and current-look sample sequence for a 0 to 1 transition followed by another 1, it is seen that the synchronized port corresponds to 7-2 at time $i$ and shifts to 7-1 at $i + 2$ and to 7-3 at $i + 5$. The shift from terminal port 7-1 to terminal port 7-3 at $i + 5$ indicates that the pulse stream has drifted by one full clock interval. Should synchronization circuit 8 proceed immediately to select and sample from port 7-3, it is seen from FIG. 3 that pulse 5 would be erroneously sampled twice, first from port 7-1 at time $i + 4$ and then from port 7-3 at time $i + 5$. In accordance with another feature of my invention, this erroneous result is corrected by omitting a sample at time $i + 5$ and every time a shift from ports 7-1 to 7-3 is indicated.

Figure 4:
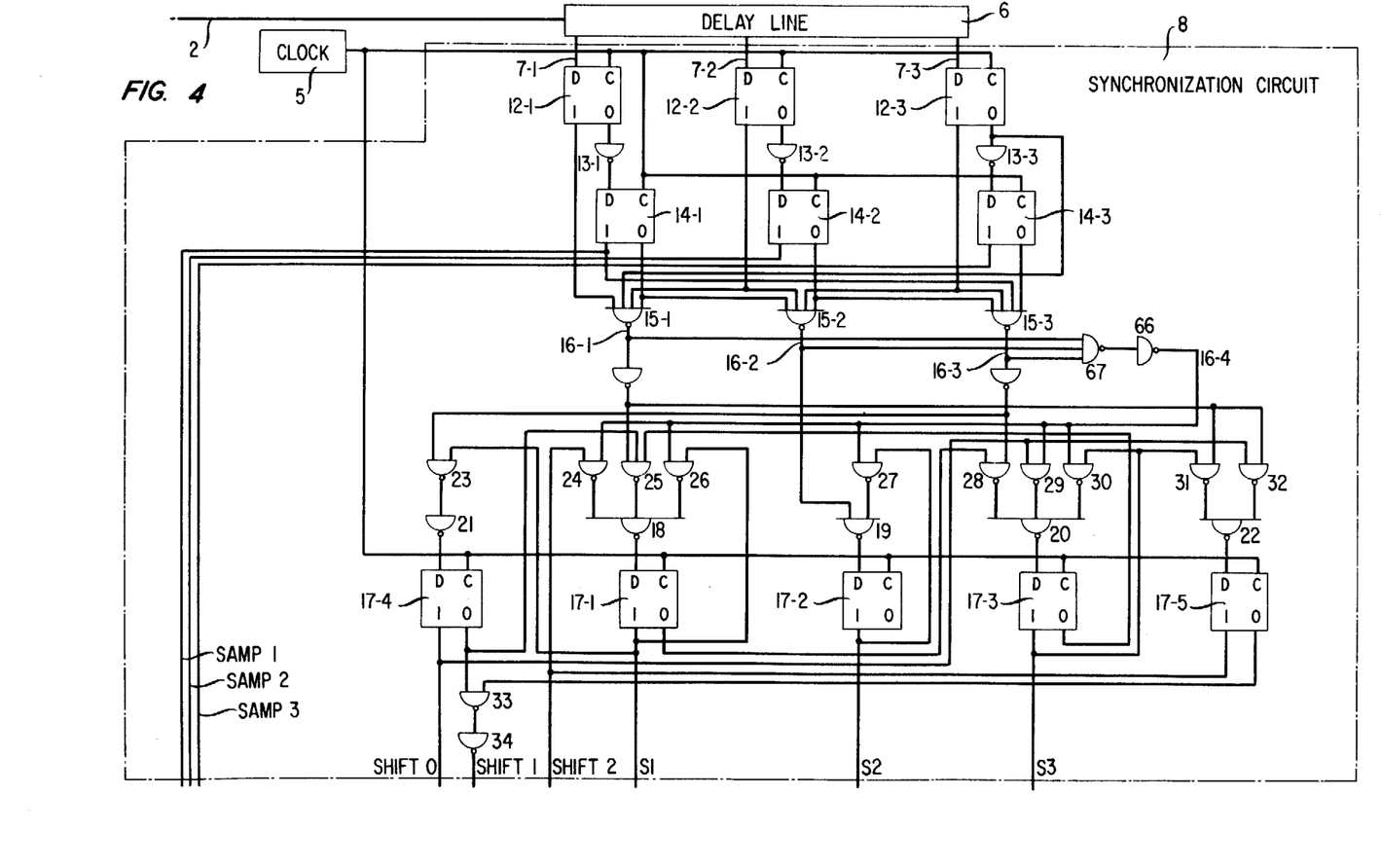
FIGS. 4, 5, 6 and 7 when arranged according to FIG. 8, contain the details of a preferred exemplary embodiment of the invention.
Figures 7, 8:
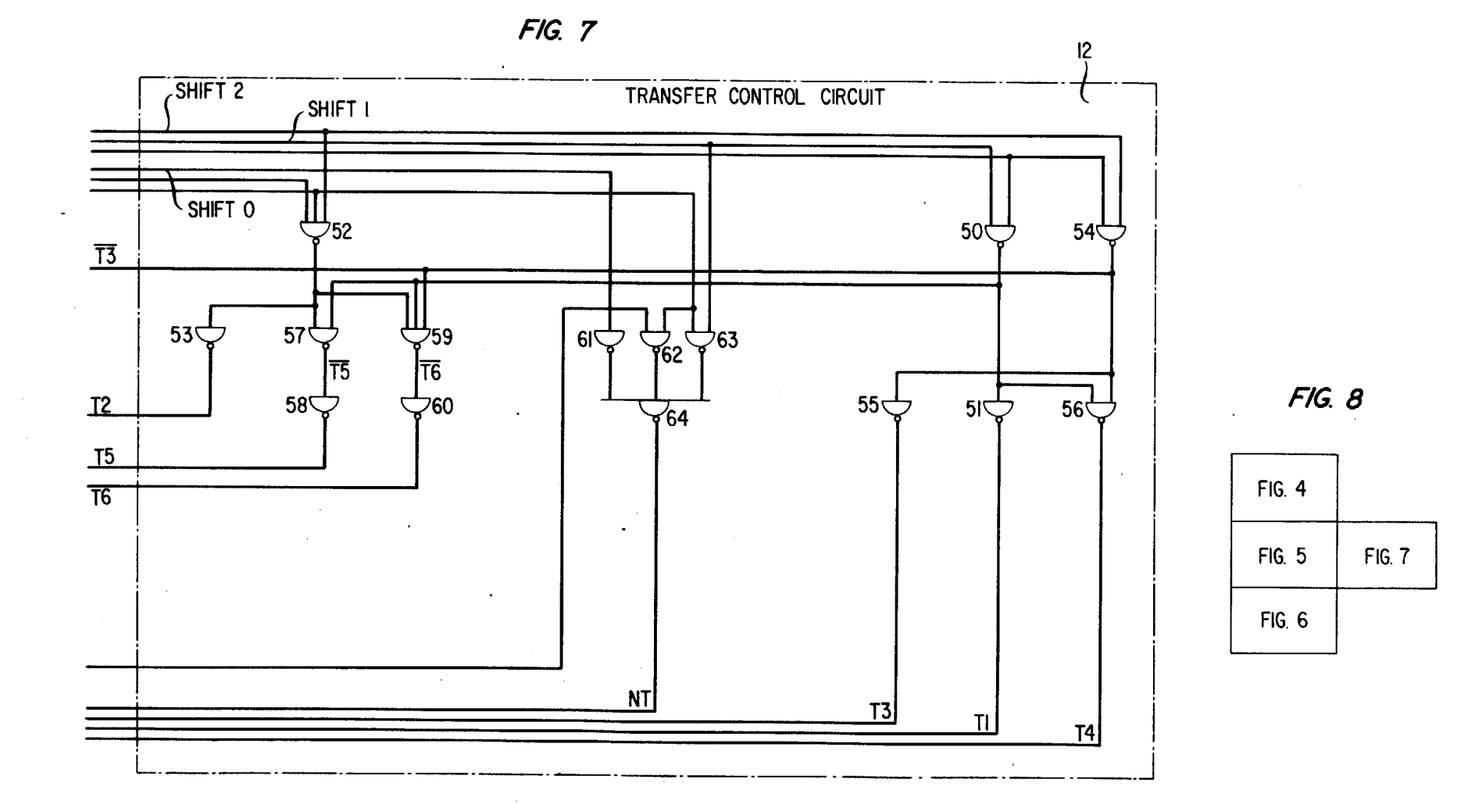

The details of a preferred exemplary embodiment of the receiver of FIG. 1 for executing the above synchronization method are depicted in FIGS. 4, 5, 6 and 7 when arranged according to FIG. 8. In FIG. 4 is shown the transmission line 2 on which an incoming pulse stream is present, the delay line 6 having output ports 7-1 to 7-3, and the details of synchronization circuit 8. The details of shift register 9 and transfer register 10 are in respective FIGS. 5 and 6. Transfer control circuit 12 is shown in FIG. 7.

In the preferred embodiment, delay line 6 continuously delays the instantaneous pulse states of transmission line 2 by approximately two-thirds of a clock interval or 40 nanoseconds. Thus, for example, the leading edge of an incoming pulse appearing at the input of delay line 6, or port 7-1 will appear 20 nanoseconds later, at port 7-2 and again 40 nanoseconds later at port 7-3. Similarly, any other pulse state at the input of delay line 6 will be delayed by the same amounts of time.

The delay, or D-type, flip-flops 12-1 to 12-3 in FIG. 4 are for storing the current-look pulse samples and are connected to the respective delay line output ports 7-1 to 7-3. These flip-flops are controlled by the signals from clock 5 to store simultaneously each clock time the current state of the delayed pulse signals appearing on ports 7-1 to 7-3. The outputs of flip-flops 12-1 to 12-3 are connected by means of gates 13-1 to 13-3 to the D inputs of other flip-flops 14-1 to 14-3 which store the last-look samples. These latter flip-flops are also controlled by clock signals to store the samples from flip-flops 12-1 to 12-3 concurrently as port samples are inputted into flip-flops 12-1 to 12-3. Thus, the flip-flops 14-3 to 14-1 and 12-3 to 12-1, in that order, maintain at all times a sequence of the most recent six samples of pulses from transmission line 2. It is emphasized that although the use of a delay line for generating samples is preferred because it allows the use of a lower frequency clock, it is not essential to the invention and any means of generating plural samples is sufficient.

The gates 15-1 to 15-3 operate to decode, or detect the 0 to 1 sample transitions, discussed with reference to FIGS. 2 and 3, in the sequence of flip-flops 14-3 to 14-1 and 12-3 to 12-1. For noise immunity purposes, these decoding gates operate to detect the sample sequence 0, 0, 1, 1 rather than the 0, 1, 1 sequence described earlier. This detection of double 0's and 1's insures that a true 0 pulse is present and followed by a true 1 pulse. Furthermore, the second 1 sample in sequence after the 0 to 1 transition, most nearly corresponds to the middle third of the duration of the pulse from which it was taken and defines the currently synchronized port of 7-1 to 7-3. Specifically, gate 15-1 operates to detect the sequence 0,0,1,1 in flip-flops 14-1 and 12-3 to 12-1, which defines port 7-1 as the synchronized port. Similarly, gate 15-2 operates to detect that sequence in flip-flops 14-2 to 14-1 and 12-3 to 12-2 for port 7-2 when synchronized, and gate 15-3 detects that sequence in flip-flops 14-3 to 14-1 and 12-3 when port 7-3 is in synchronization with the clock. The outputs on leads 16-1 to 16-3 from decoding gates 15-1 to 15-3 are used for partially controlling operations of the synchronization circuit 8 state flip-flops 17-1 to 17-5. An operation of each of the state flip-flops 17-1 to 17-3 corresponds respectively to a selection of the output ports 7-1 to 7-3. State flip-flop 17-4 is operated temporarily when a received sample sequence indicates a desired shift in synchronized ports from 17-1 to 17-3 for causing a sample omission as discussed with reference to FIG. 3. Conversely, state flip-flop 17-5 is operated upon a desired shift from port 7-3 to 7-1 for causing a double sampling as in FIG. 2.

The state flip-flops 17-1 to 17-5 control signals to shift register 9 on the leads S1 to S3 and SHIFT0 to SHIFT2. Specifically, when synchronization circuit 8 is in state 1, flip-flop 17-1 is operated and a high signal appears on lead S1. This signal causes an insertion of a pulse sample from flip-flop 14-1 into shift register 9 via lead SAMP1 with the occurrence of each clock signal. Likewise, when circuit 8 is in states 2 or 3, a high signal appears on the appropriate lead S2 or S3 and causes a sample insertion into register 9 from the sampling flip-flop 14-2 or 14-3 via leads SAMP2 and SAMP3. The signals on leads SHIFT0 to SHIFT2 control the shifting operations of register 9. A high signal appears on lead SHIFT1 when circuit 8 is in states 1, 2 or 3 and that signal causes register 9 to shift its contents forward by one stage with each clock signal for effecting single sample insertions thereto. This operation occurs during the normal phase tracking operation as opposed to phase compensating operations. A high signal appears on lead SHIFT0 when state 4 is active (flip-flop 17-4 operated) for preventing a shifting operation of register 9, thereby to omit a sample insertion during the phase compensating operation of FIG. 3. And, when in state 5 with flip-flop 17-5 operated, a high signal is on lead SHIFT 2 for causing register 9 to shift its contents by two stages to phase compensate as shown in FIG. 2. Concurrently with this double shifting operation a sample from each of the sampling flip-flops 14-3 and 14-1 is inserted into register 9 for effecting double sampling to avoid not sampling a pulse during the phase compensation.

The transfer control circuit in FIG. 7 operates with the control signals on leads SHIFT0 through SHIFT2 to transfer a sample byte from register 9 to register 10 each time register 9 becomes fully loaded. Immediately after a byte transfer, control signals from circuit 12 operate to preset a 1 flag in an initial stage of register 9 and to reset the following stages thereof to 0. When that flag arrives in either of the final two stages SR7 or SR8 of register 9, a byte transfer may occur depending upon whether or not a SHIFT2 or SHIFT1 signal occurs from synchronization circuit 8. The operation of transfer control circuit 12 will be discussed in more detail below.

Consider the situation in which circuit 8 is in an initial state with register 9 stage SR1 preset to 1 and stages SR2 to SR8 preset to zero. It is noteworthy that no special circuitry is required for achieving this initial state as the receiver automatically self-aligns after the receipt of only a few initial pulses of a pulse stream on transmission line 2. For the same reason, the initial state of the sampling and state flip-flops is not important. Assume further that a stream of incoming pulses is present on transmission line 2 at a time corresponding to $i$ in FIG. 2. The sequence 0,0,1,1 appears in last-look flip-flops 14-2 to 14-1 and current-look flip-flops 12-3 to 12-2, thereby indicating that the pulse 1 signal on delay line port 7-2 and the sample therefrom stored in flip-flop 12-2, is in synchronization with the clock. That pulse sample will be routed to shift register 9, but as will be seen, not until two cycles later, or at clock time +2. This delay is a result of the delay inserted by the current and last-look sampling flip-flops. Immediately after clock time $i$, the foregoing sequence 0, 0, 1, 1 causes each of the inputs of decoding gate 15-2 to become high and its output low on lead 16-2. The decoding gates 15-1 and 15-3 do not respond to this sample sequence and their outputs remain high. The low on lead 16-2 appears as a high from gate 19 at the D input of state flip-flop 17-2 and causes that flip-flop to be operated at the next clock time $i+1$. Also, at clock time $i+1$, the pulse 1 sample stored in the current-look flip-flop 12-2, as well as the samples in flip-flops 12-1 and 12-3, are inputted via logic gates 13-1 to 13-3 to last-look flip-flops 14-1 to 14-3 and new samples from ports 7-1 to 7-3 are inputted into the current-look flip-flops.

The operation of state flip-flop 17-2 causes a high to appear on lead S2 for enabling the shift register 9 input gate 36 to stage SR1. The remaining input to gate 36 is from last-look flip-flop 14-2 via lead SAMP2 on which, after clock time $i+1$, appears the pulse 1 sample taken at time $i$. Accordingly, at clock $i+2$, the pulse 1 sample is inserted from flip-flop 14-2 into stage SR1 of shift register 9 by means of gate 36. Gates 35 and 37 perform the equivalent function of gate 36 when respective ports 7-1 and 7-3 are selected. They are enabled by the state flip-flops 17-1 and 17-3 for inputting into stage SR1 from the respective sampling flip-flops 14-1 and 14-3. At the same time, the contents of each of the stages SR1 to SR7 are shifted into the next higher stage by means of shift register input gates 38-2 to 38-8 which are enabled by a high signal of lead SHIFT1. This high is present in virtue of the connections from 0 outputs of state flip-flops 17-4 and 17-5 to gate 33 whose resulting low output is inverted by gate 34. The NAND gtes 41-1 to 41-8 operate as NEGATIVE OR gates for passing to the respective shift register 9 stages any activated input such as from gates 35 and 38-2 to 38-8. The outputs of the gates 41-1 to 41-8 each connect to at least one of the $D_1$ and $D_2$ inputs of the stages SR1 to SR8. Each stage contains conventional circuitry for ANDING the states on $D_1$ and $D_2$ to produce the final state acquired by the stage. The $D_1$ inputs of stages SR2 to SR8 are controlled by transfer control circuit 12 for presetting these stages after transfer operations between registers 9 and 10 as will be seen. During the inputting operation above described, the $D_1$ inputs are maintained high so that only the signals from gates 41-1 to 41-8 control the shift register stages.

After the operation of state flip-flop 17-2 at time $i+1$, the flop-flop is held operated by gate 27 until a state change is indicated by receipt of a different 0,0,1,1 sample sequence. For this purpose, the left input of gate 27 is connected to lead 16-4 which is held high by gates 66 and 67 in FIG. 4 when none of the decoding gates 15-1 to 15-3 are activated. Gates 26 and 30 provide an equivalent function for state flip-flops 17-1 and 17-3 when operated.

At time $i+3$, the pulse 2 sample received at $i+1$ is gated from flip-flop 14-2 into register 9. However, at $i+3$, a new state flip-flop 17-3 is operated as a result of the 0,0,1,1 sequence which appeared at time $i+2$ in flip-flops 14-3 to 14-1 and 12-3. This operation is performed by gates 20 and 28 which are activated by a signal from decoding gate 15-3 whenever state flip-flop 14-1 is nonoperated. Accordingly, at $i+4$, circuit 8 routes a pulse 3 sample from flip-flop 14-3 associated with port 7-3 to shift register 9.

Also at time $i+3$, another sample sequence is received which indicates a desired shift from port 7-3 to 7-1. As has been described, this sequence of events indicates that the phase of the pulses has drifted by at least one clock interval and compensation therefor is required to prevent the omission of a sample of pulse 4. Instead of activating the state flip-flop 17-1 at time $i+4$, intermediate state 5 flip-flop 17-5 is operated. For this function the left input of gate 31 is enabled when circuit 8 is in state 3 (flip-flop 17-3 operated). The right input is enabled by a port 7-1 selection signal on lead 16-1 from decoding gate 15-1. As a result, state flip-flop 17-5 is operated at $i+4$ by gate 31 operating through gate 22. An operation of state 1 flip-flop 17-1 by the signal from decoding gate 15-1 is precluded by low signal appearing at the right input of gate 25 from the 0 output of the state flip-flop 17-3.

Figure 5:
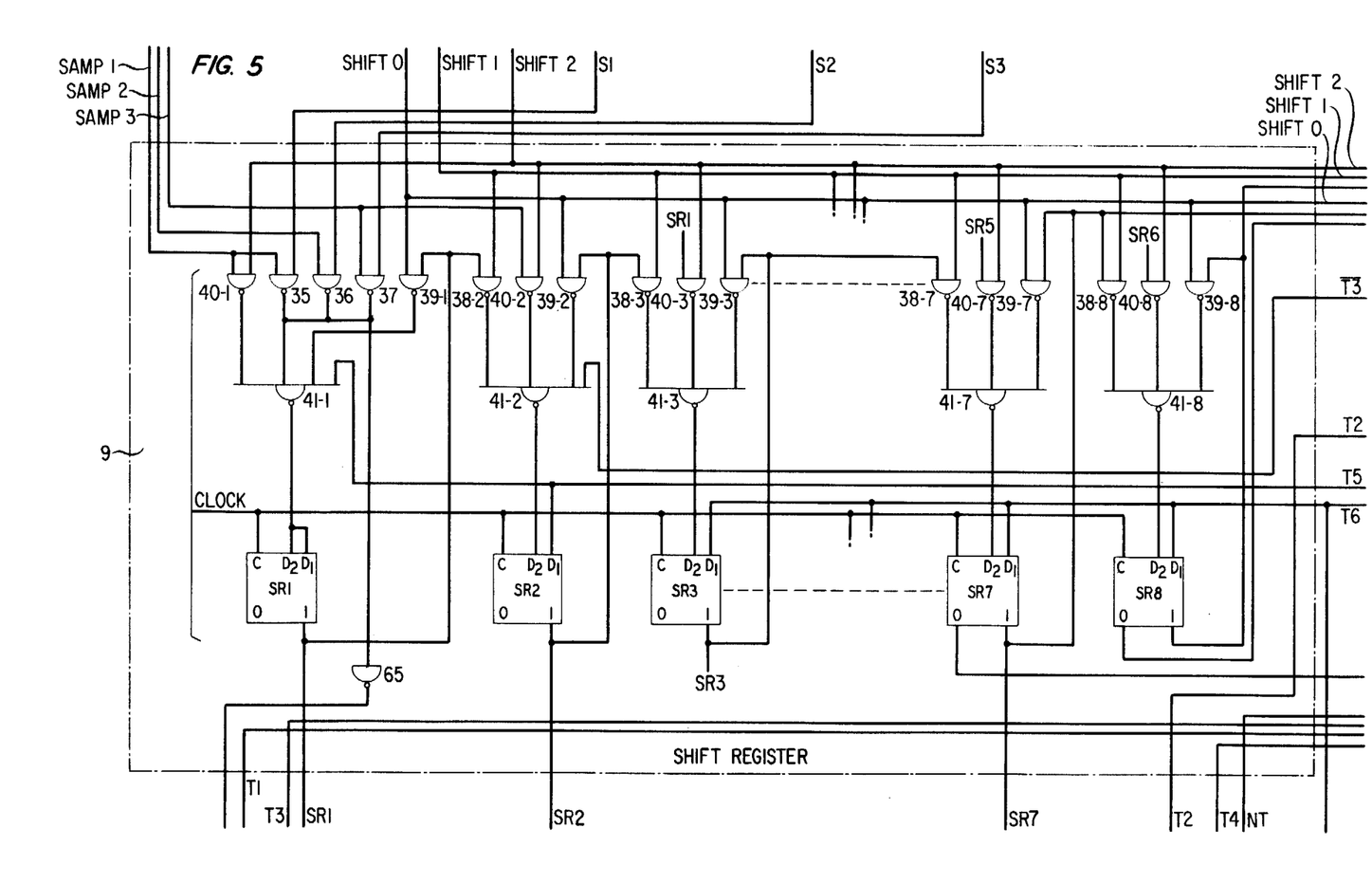
Figure 6:
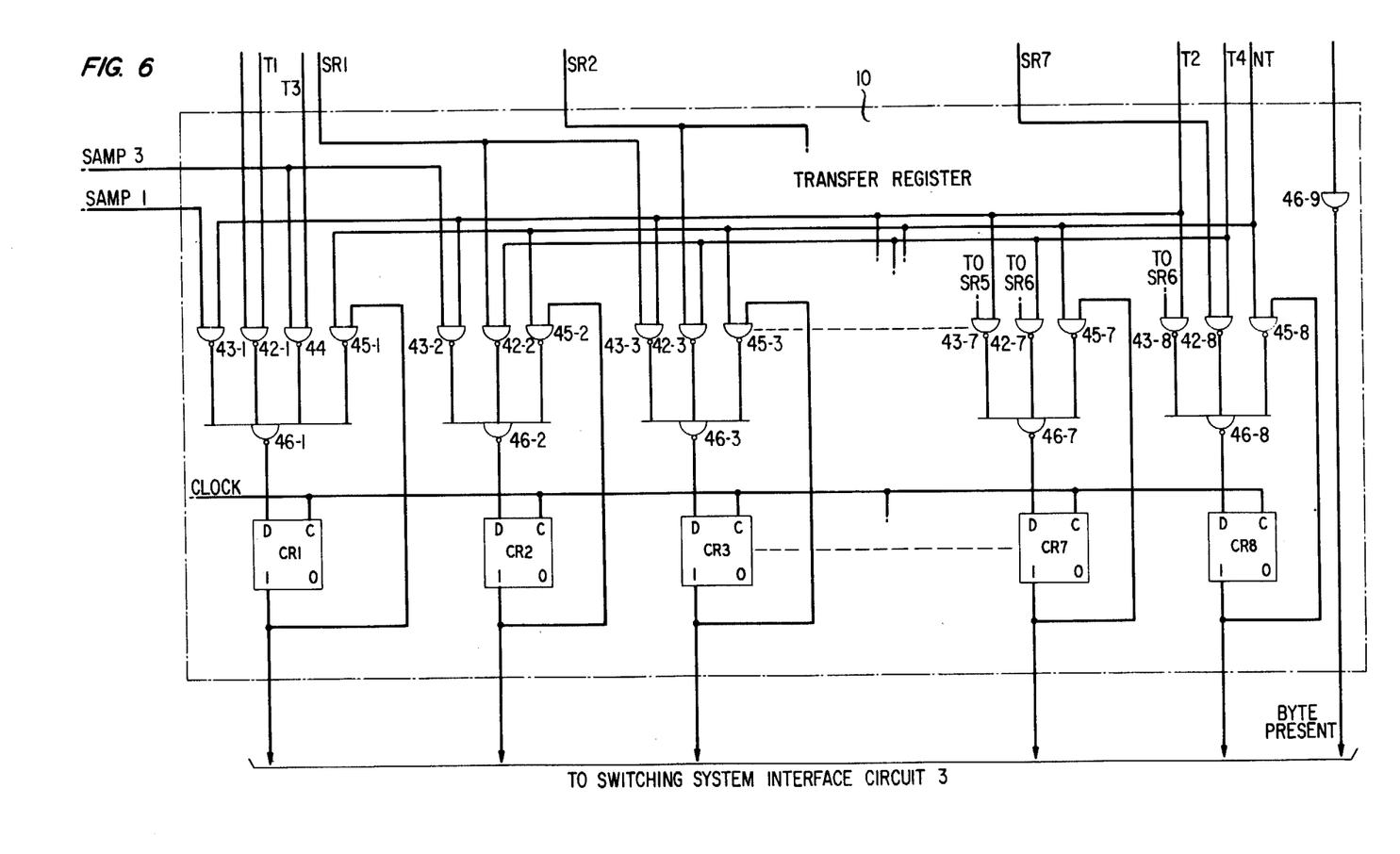

The operation of the state 5 flip-flop 17-5 places a high control signal on lead SHIFT2 which enables each of the shift register input gates 40-1 to 40-8 in FIG. 5. The remaining input to each of these gates for stages SR3 to SR8 is from the 1 output of the shift register stage two stages before. The stages SR4 through SR7 and corresponding gates 40-4 to 40-7 are not shown for simplicity. Accordingly, at the next clock time, $i+5$, (not shown in FIG. 2), the SHIFT2 signal advances the contents of register 9 by two stages. A sample corresponding to pulse 4 is inputted into stage SR2 from flip-flop 14-3 (port 7-3) via gate 40-2. A sample for pulse 5 is simultaneously inputted into stage SR1 from flip-flop 14-1 (port 7-1) via gate 40-1. Thus, phase drift compensation is accomplished at this time without the omission of a pulse 4 sample.

Following the foregoing double sampling operation in state 5, circuit 8 advances at a clock time $i+6$ (not shown) to the port 7-1 by operating state flip-flop 17-1. This operation is performed by gate 18 and gate 24 whose left input is enabled by the state 5 flip-flop 17-5 and whose right input is enabled by gate 66 when none of the decoding gates 15-1 to 15-3 are activated.

I turn now to the situation in which the incoming pulse frequency is less than the clock frequency as illustratively shown in FIG. 3. In the situation, synchronization circuit 8 operates essentially as described immediately above, but with the difference that the circuit tracks generally in the opposite direction, from port 7-3 to 7-2 to 7-1, thence returning to 7-3. Another difference is that appropriate circuitry is provided for activating the state 4 flip-flop 17-4 between the transition from state 1 to state 3 to compensate for the pahse drift by omitting a pulse sample that would otherwise be sampled twice. Thus, upon a receipt of a port 7-3 select signal on lead 16-3 when in state 1 (flip-flop 17-1 operated), gate 23 is activated for setting flip-flop 17-4 through gate 21. An operation of flip-flop 17-4 places a high control signal on lead SHIFT0 for causing shift register 9 to omit the insertion of a pulse sample. The SHIFT0 signal enables each of the shift register gates 39-1 through 29-8 associated separately with each stage SR1 to SR8 of register 9. The remaining input of each gate is from the 1 output of the stage with which each gate is associated so that at the following clock time, the contents of the stages are merely looped and no sample insertion occurs. Thus, in FIG. 3, the double sample of pulse 5 at time $i+5$ is omitted. The reader should remember that the omission of the double sample in the preferred embodiment occurs at time $i+7$, rather than $i+5$ due to the delay inserted by the last and current-look sampling flip-flops.

From state 4, circuit 8 normally tracks to state 3 at the next clock time. Gate 29 is partially enabled by an operation of state flip-flop 17-4 for this purpose and a signal from gate 66 totally enables gate 29 for operating state flip-flop 17-3. Thereafter circuit 8 continues sampling and tracking operations as already described.

Notwithstanding the fact that circuit 8 will generally track circularly from port to port when the pulse frequency is different from the clock frequency, it may occur that, due to pulse jitter, or a discontinuity in pulse frequency or the like, circuit 8 may follow deviations from the orderly circular tracking. For example, circuit 8 may advance from port 7-2 to either port 7-1 or 7-3 regardless of the general drift in phase, depending only on the particular samples received in the sampling flip-flops. Furthermore, it is possible to advance from intermediate state 4 to intermediate state 5, although the converse transition is impossible due to restraints imposed by the particular sample sequence 0, 0, 1, 1 which is selected. The transition from states 4 to 5 occurs when, in state 4, a port 7-1 selection signal is received and is provided for by gate 32 in FIG. 4, which is enabled by state 4 flip-flop 17-4 upon receipt of a signal from decoding gate 15-1. A simultaneous activation of the state 1 flip-flop 17-1 by the port 7-1 selection signal is precluded by a low inhibit signal on the middle input of gate 25 from the reset side of the state flip-flop 17-4.

I turn now to a discussion of the unloading operations of shift register 9 under control of transfer control circuit 12. As mentioned, immediately following a byte transfer from register 9 to register 10, an initial stage of register 9 is preset to 1 as a byte present flag and the remaining final stages are zeroed so that when the flag reaches a final stage of register 9 a transfer occurs. The initial stage which is preset and the final stage in which the flag causes a transfer is dependent upon the control signals SHIFT0 to SHIFT2. A transfer condition arises when a SHIFT1 signal occurs and the flag is in the last stage SR8 of register 9. Two other transfer conditions arise when a SHIFT2 signal occurs and the flag is in either of stages SR7 or SR8 of register 9 since the SHIFT2 signal will cause an overflow of register 9.

The transfer control circuit 12 in FIG. 7 develops the control signals T1 through T3 which correspond respectively to the above three transfer conditions. In addition, circuit 12 generates signals NT, meaning "no transfer," and signals T4 through T6 which represent logical combinations of the signals T1 through T3. T4 occurs with either T1 or T3. T5 occurs with either T1 or T2. T6 occurs with either T1, T2 or T3.

To generate T1, gate 50 in FIG. 7 combines the 1 output of register 9 stage SR8 and a SHIFT1 signal to generate a low which is inverted by gate 51.

Gate 52 combines the conditions of a SHIFT 2 signal, and a 0 and 1 in respective stages SR8 and SR7 of register 9 to generate a signal which is inverted by gate 53 to form the T2 signal.

Gate 54 detects a SHIFT2 signal and 1 in register 9 state SR8 to form a low output signal which is inverted by gate 55 to form the T3 signal.

T4 is formed from the complements of T1 and T3 by gate 56; T5 is formed by gates 57 and 58. T6 is formed by gates 59 and 60. The NT signal is formed by gates 61 through 64 for all other occurrences of SHIFT0 to SHIFT2 and states of stages SR7 and SR8 of register 9.

In the T1 condition, the first seven samples of the 8-bit byte to be transferred are located in register 9 stages SR1 to SR7. These samples are transferred to register 10 stages CR2 to CR8. The last, or eighth, sample of the byte is obtained from the sampling flip-flop 14-1 to 14-3 which is associated with the currently selected port 7-1 to 7-3 and inserted directly into the first stage CR1 of register 10. The T1 signal enables the register 10 input gate 42-1, the other input of which is from "collector-tied" input gates 35, 36, and 37 of register 9 input stage SR0, through gate 65 for steering a sample from the currently selected port sampling flip-flop to stage CR1. A T4 signal occurs concurrently with T1 and operates to steer the remaining seven samples from register 9 stages SR1 through SR7 into register 10 stages CR2 to CR8 via gates 42-2 through 42-8. The NAND gates 46-1 to 46-8 merely operate as NEGATIVE OR gates for steering each of proper input signals to its respective stage. Gate 46-9 is controlled by the T6 signal to activate the byte present flag for alerting interface circuit 3 of the transfer. Stage SR1 of register 9 is preset to 1 for the next byte by the T5 signal appearing at the right-most input of gate 41-1. That signal forces the output of gate 41-1 high which, in turn, sets stage SR1 at the next clock time. Stage SR2 is reset to 0 also by the T5 signal which appears at the $D_1$ input of that stage. The remaining stages SR3 through SR8 are reset to 0 by the T6 signal which appears at their $D_1$ inputs.

In the T2 transfer condition, occurring when the byte present flag is in register 9 stage SR7 and a SHIFT2 signal occurs, the first six samples of the byte are located in stages SR1 to SR6 of register 9 and are transferred therefrom to register 10 stages CR3 to CR8. The final two samples completing the byte are inserted directly into stages CR2 and CR1 from the sampling flip-flops 14-3 and 14-1 respectively associated with the last and the new synchronized ports 7-3 and 7-1. The T2 signal enables register 10 input gates 43-3 through 43-8 for steering the samples from register 9 stages SR1 through SR6 to register 10 stages CR3 through CR8. The T2 signal also enables gates 43-2 and 43-1 for steering samples from sampling flip-flops 14-3 and 14-1 into the stages CR2 and CR1, respectively. The byte present flag is activated by the T6 signal via gate 46-9 and the register 9 stages SR1 through SR8 are preset as described above.

In the final transfer condition T3, occurring when the byte present flag is in the final stage SR8 of register 9 and a SHIFT2 signal occurs, seven of the eight byte samples are already in shift register 9 and are transferred from stages SR1 to SR7 to register 10 stages CR2 through CR8. The next sample completing the block is transferred from sampling flip-flop 14-3 to stage CR1. Another sample, which must be buffered because of the SHIFT2 signal, is inserted from sampling flip-flop 14-1 into register 9 stage SR1 as the first sample of the next byte. In this case, the byte present flag must be inserted into stage SR2 of register 9 rather than stage SR1 and stages SR3 to SR8 are reset to 0. Gate 44 is enabled by the T3 signal for steering a sample from sampling flip-flop 14-3 into register 10 stage CR1. A resultant T4 signal transfers the samples from shift register 9 to register 10 via gates 42-2 to 42-8 as was described for transfer conditon T1. For buffering the first sample of the next byte from flip-flop 14-1, input gate 40-1 for stage SR1 is enabled by the signal SHIFT2. The next byte present flag is inserted into stage SR2 by the complement of the T3 signal which is routed to the right-most input of gate 41-2 for stage SR2. That signal forces the output of the gate high for setting that stage. The remaining stages SR3 through SR8 are reset to 0 by the T6 signal which appears at each of the $D_1$ inputs of these stages.

After a transfer to register 10, the contents of each stage of register 10 are maintained until the next transfer by means of input gates 45-1 to 45-8. Each of these gates is enabled during this time by a signal on lead NT from control circuit 12 and operate to merely loop its contents with the occurrence of each clock signal. The NT signal is maintained by circuit 12 until the occurrence of the next transfer condition. During this time, the interface circuit 3 reads the byte from register 10 for processing in a prescribed manner.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:

1. A method of synchronizing the reception of serial pulses of a pulse stream, comprising the steps of
generating binary sequences representing multiple samples of received pulses,
using the sequences to control the selection of ones of the samples having a predetermined phase relationship to the pulse stream,
analyzing successive sequences to determine when the pulses have drifted with respect to the selected samples, and
compensating for the drift by controlling the selection of other prescribed ones of the samples.

2. A method of synchronizing a receiver for receiving pulses of a serial pulse stream, comprising the steps of
sampling the pulse stream at a rate greater than the rate of arrival of pulses,
detecting transitions of state between consecutive samples,
selecting first samples having a predetermined phase relationship to the last-detected transition in order to reconstruct the pulse stream,
ascertaining from a history of sample transitions when pulses have drifted by a prescribed amount with respect to the sampling times, and selecting other samples to compensate for the phase drift.

3. The method of claim 2 wherein
the step of ascertaining the amount of phase drift includes determining the direction of phase drift with respect to the sampling times and
the step of selecting said other samples includes plural sampling and the omission of samples in accordance with the direction of drift.

4. A method of synchronously receiving a stream of incoming pulses of a prescribed frequency, comprising the steps of
sampling the pulses at at least three times the pulse frequency,
maintaining a sequence of a prescribed number of the most recent samples,
detecting state transitions between consecutive samples within a sequence to ascertain the phase relationship between the pulses and the sampling times,
selecting preferred samples identified by the sequence location of the last detected state transition,
storing each selected sample in time sequence to reconstruct the pulse stream, and
determining from movement of the location of state transitions within the sequence when the phase of the pulses has drifted by a prescribed amount relative to the times of generating samples.

5. The method of claim 4 wherein the said determining of movement includes
ascertaining whether the phase of the pulses is leading or lagging the samples,
storing two predetermined samples from the sequence when the phase drift has accumulated in a leading direction by the prescribed amount, and omitting the storing of a sample when the phase drift has accumulated in a lagging direction by the prescribed amount.

6. A receiver for synchronizing the reception of serial pulses of a pulse stream, comprising
means for generating binary sequences representing multiple samples of received pulses,
means responsive to said sequences for controlling the selection of ones of the samples having a predetermined phase relationship to the pulse stream, means for analyzing successive sequences to determine when the pulses have drifted with respect to the selected samples, and means for compensating for the drift by controlling the selection of other prescribed ones of the samples.

7. A receiver operated by clock signals for receiving serial pulses, comprising
means operated by said clock signals for generating multiple spaced samples of each of said pulses,
means for detecting prescribed sequences of said samples indicative of the phase relationship between said pulses and clock signals,
state means operated by said detecting means for dynamically controlling the selection of ones of said samples having a preferred phase relationship with said clock signals as said pulses drift in phase relative to said clock signals, and
output means controlled by said state means and clock signals for accepting said selected samples.

8. The invention of claim 7 wherein said output means comprises first means for registering said selected samples,
second means for storing the contents of said first means, and
means responsive to said state means and said first means for periodically controlling a transfer of said contents from said first to said second means.

9. The invention of claim 7 wherein said state means comprises
first and second state circuits each operated jointly by the other and said detecting means,
said first state circuit being operative for controlling said output means in a first mode while the relative phase shift between said pulses and clock signals is within prescribed bounds, and
said second state circuit being operative for controlling said output means in a second mode when the accumulated phase drift exceeds said prescribed bounds.

10. The invention of claim 9 wherein said output means further comprises
means controlled by said first state circuit for steering one selected sample from said generating means to said output means with the occurrence of each clock signal, and
means controlled by said second state circuit for steering predetermined ones of the samples from said generating means to said first means with the occurrence of a clock signal to compensate for the phase drift.

11. A receiver operated by an independent source of clock signals for receiving serial pulses of a prescribed duration and frequency, comprising
means for generating multiple samples of each said pulse successively spaced by substantially equal time increments,
a plurality of storage elements for maintaining a prescribed number of most recent samples of said pulse signals in time ordered sequence,
a plurality of means each for detecting state transistions in prescribed ones of said elements identifying preferred ones of said elements having samples of a preferred phase relationship with said clock signals,
first state means operated by each of said detecting means for tracking a drift in phase between said pulses and clock signals,
output means controlled by said clock signals and said first state means for accepting samples from said preferred elements in a first operating mode, and
second state means operated jointly by prescribed ones of said detecting means and said first state means for controlling operations of said output means in a second mode each time the phase drift exceeds a prescribed amount.

12. The invention of claim 11 wherein said first state means comprises
a plurality of first state devices each associated with a separate one of said elements and operated by a separate one of said detecting means for controlling the insertion of samples from its associated element into said output means.

13. The invention of claim 12 wherein said second state means comprises
a second state device operated each time the phase drift of said pulses exceeds said prescribed amount in a first direction for preventing a sample insertion into said output means, and a third state device operated each time the phase drift of said pulses exceeds said prescribed amount in a second direction for causing an insertion of multiple samples from prescribed ones of said elements to said output means.

14. The invention of claim 11 wherein said output means comprises
   a shift register for serially accumulating samples from said preferred elements,
   an output register for receiving the contents of said shift register, and
   a control circuit responsive to said first and second state means and to the contents of said shift register for transferring said contents to said output register.

15. A receiver operated by clock signals of a given frequency for receiving serial pulses of a prescribed duration and substantially the same frequency, comprising
   means having an input port for accepting said pulses and operative for generating on consecutive ones of a plurality of output ports successively delayed pulse signals in response to each of said pulses,
   a plurality of storage elements each individually associated with a separate one of the output ports and operated by said clock signals for storing samples of said pulse signals,
   a plurality of means each for detecting a prescribed sequence of samples in consecutive ones of said elements signifying the relative phase of said pulses with respect to said clock signals and identifying a preferred one of said output ports having pulse signals in a preferred phase relationship with said clock signals,
   state means operated by each of said detecting means for dynamically tracking said preferred output port as said pulses drift in phase with respect to said clock signals,
   output means operated by said clock signals, and
   means controlled by said state means for associating said output means with said preferred output port for synchronous pulse reception.

16. The invention of claim 15 wherein said state means comprises
   a plurality of first state devices individually associated with separate ones of said output ports and each activated by separate ones of said detecting means for controlling the establishment of a communication path including one of said elements between said preferred port and said output means, and
   means activated each time the phase drift exceeds a prescribed amount for controlling the establishment of communication paths between other predetermined output ports and said output means to compensate for the phase drift.

17. The invention of claim 16 wherein said last mentioned controlling means comprises
   a second state device operated each time the phase drift of said pulses exceeds said prescribed amount in a first direction for simultaneously establishing communication paths between first and last ones of said output ports and said output means, and
   a third state device operated each time the phase drift of said pulses exceeds said prescribed amount in a second direction for preventing communication between said output ports and said output means.

18. The invention of claim 17 wherein said state means further comprises
   means responsive to an operation of a first one of said detecting means associated with said first output port successively following an operation of a second one of said detecting means associated with said last output port for operating said second state device, and
   means responsive to an operation of said second one of said detecting means successively following an operation of said first detecting means for operating said third state device.

19. The invention of claim 16 wherein said generating means comprises
   a delay line for providing continuous delay of at least two-thirds of said pulse duration and having said input port and at least three output ports equally spaced along said delay line and wherein said storage elements comprise at least five flip-flops operated by said clock signals for storing samples of the pulse signals from said output ports.

20. The invention of claim 19 wherein each of said detecting means is associated with a separate one of said output ports and said first state devices and comprises a logic gate responsive to a sample sequence in prescribed ones of said flip-flops signifying a pulse transition.

21. A circuit for receiving serial pulses of a prescribed arrival rate, comprising
   an independent source of clock signals,
   means operated by said clock signals for sampling said pulses at at least three times the pulse arrival rate,
   means for continuously maintaining a prescribed number of most recent samples,
   means for detecting the arrival of pulse transitions from prescribed sequences of said most recent samples and including
   means for identifying a preferred one of the samples corresponding to the pulse creating the transition and having a preferred phase relationship with said clock signals,
   output means having means controllable for sequentially steering said one and subsequent samples identified by said one sample to said output means until a detection of another of pulse transition, and
   means for controlling said steering means, including
   first means for causing the simultaneous steering to said output means of two prescribed ones of said sample each time the pulses drift in phase by a prescribed amount in a first direction relative to said clock signals, and
   second means for preventing the steering of a sample to said output means each time the phase shift exceeds said prescribed amount in another direction.

22. The invention of claim 21 wherein said output means comprises
   a shift register,
   a transfer register, and
   a transfer control circuit responsive to said controlling means and to the contents of said shift register for periodically effecting a transfer of the contents of said shift register to said transfer register.

23. The invention of claim 22 wherein said receiver further comprises means responsive to said controlling means and to said transfer control circuit for setting a flag in one of prescribed initial stages of said shift register after a transfer of the contents thereof to said transfer register.

24. The invention of claim 23 wherein said transfer control circuit comprises means responsive to said controlling means and to the appearance of said flag in prescribed ones of the final stages of said shift register for causing a transfer of the contents of said shift register to said transfer register.

* * * * *